(12) United States Patent
Arumugam et al.

(10) Patent No.: US 8,976,644 B2
(45) Date of Patent: Mar. 10, 2015

(54) MULTICAST TRAFFIC FORWARDING ON PRUNED INTERFACE

(71) Applicant: International Business Machines Corporation, Armonk, NY (US)

(72) Inventors: Sivakumar Arumugam, Milpitas, CA (US); Chidambaram Bhagavathiperumal, Santa Clara, CA (US); Ashok K. M. Somosundaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 13/745,636

(22) Filed: Jan. 18, 2013

(65) Prior Publication Data
US 2014/0204732 A1    Jul. 24, 2014

(51) Int. Cl.
*G01R 31/08* (2006.01)
*H04L 12/707* (2013.01)

(52) U.S. Cl.
CPC ..................................... *H04L 45/22* (2013.01)
USPC ........................................... 370/217; 370/400

(58) Field of Classification Search
CPC .......... H04L 12/56; H04L 45/24; H04L 45/58
USPC ........................ 370/351–360, 390–393, 401
See application file for complete search history.

(56) References Cited

U.S. PATENT DOCUMENTS

| | | | |
|---|---|---|---|
| 6,169,741 B1 | 1/2001 | LeMaire et al. | |
| 7,522,600 B1 | 4/2009 | Aggarwal et al. | |
| 7,720,066 B2 * | 5/2010 | Weyman et al. | 370/390 |
| 7,765,300 B2 | 7/2010 | Meehan et al. | |
| 2008/0205395 A1 | 8/2008 | Boddapati et al. | |
| 2011/0235638 A1 | 9/2011 | Tempia Bonda | |
| 2011/0305239 A1 | 12/2011 | Chandrashekharachar Suvarneshwar | |
| 2012/0027017 A1 | 2/2012 | Rai et al. | |
| 2012/0033668 A1 | 2/2012 | Humphries | |
| 2012/0033672 A1 | 2/2012 | Page et al. | |
| 2012/0113817 A1 | 5/2012 | Fitzgerald et al. | |
| 2013/0003733 A1 * | 1/2013 | Venkatesan et al. | 370/390 |
| 2013/0201988 A1 * | 8/2013 | Zhou et al. | 370/390 |
| 2014/0204938 A1 | 7/2014 | Arumugam et al. | |

OTHER PUBLICATIONS

Savola, P. et al., "Host Threats to Protocol Independent Multicast (PIM) (RFC5294)", Aug. 22, 2008, The IETF Trust, USA.

(Continued)

*Primary Examiner* — Kevin C Harper
(74) *Attorney, Agent, or Firm* — Sherman IP LLP; Kenneth L. Sherman; Steven Laut

(57) ABSTRACT

Embodiments of the invention relate to forwarding traffic for link aggregation groups in a system. One embodiment includes a system with a first module that receives a packet and synchronizes a group membership based on the packet. A second module receives the synchronized group membership from the first module and creates link aggregation group (LAG) entries for a primary switch and a secondary. A router receives join requests from the second module for adding a first interface link and a second interface link to the router. A source transmits traffic for the LAG. The second interface link is placed in a pruned state based on a protocol independent multicast (PIM) assert message received from the second module by the primary switch and the secondary switch. The secondary link forwards traffic in the pruned state to an access switch upon the primary link failing.

20 Claims, 5 Drawing Sheets

(56) References Cited

OTHER PUBLICATIONS

Fenner, B. et al., "Protocol Independent Multicast—Sparse Mode (PIM-SM): Protocol Specification (Revised) (RFC4601)", Feb. 27, 2007, The Internet Society, USA.

Fei, H. et al., "Design and Analysis of Multicasting Experiment Based on PIM-DM", Proceedings of the 2nd IEEE International Conference on Computer Science and Information Technology (ICCSIT '09), 2009, pp. 9-13, IEEE, USA.

Cao, J. et al., "Implementation of Multicast Protocols for High Performance Router", Computer Engineering and Design, May 2008, pp. 2431-2434, 2438, vol. 29, No. 10, People's Republic of China.

U.S. Non-Final Office Action for U.S. Appl. No. 13/745,623 mailed Jul. 16, 2014.

* cited by examiner

MULTICAST TRAFFIC FORWARDING ON PRUNED INTERFACE

BACKGROUND

The present invention relates to network switches and switching, and more particularly, this invention relates to providing multicast traffic forwarding on a pruned switch interface for a system employing features of protocol independent multicast (PIM) combined with virtual link aggregation group (vLAG) topology.

BRIEF SUMMARY

Embodiments of the invention relate to forwarding traffic for link aggregation groups in a system. One embodiment includes a system with a first module that receives a packet and synchronizes a group membership based on the packet. A second module receives the synchronized group membership from the first module and creates link aggregation group (LAG) entries for a primary switch and a secondary. A router receives join requests from the second module for adding a first interface link and a second interface link to the router. A source transmits traffic for the LAG. The second interface link is placed in a pruned state based on a protocol independent multicast (PIM) assert message received from the second module by the primary switch and the secondary switch. The secondary link forwards traffic in the pruned state to an access switch upon the primary link failing.

Another embodiment comprises a non-transitory computer-useable storage medium for forwarding link aggregation group (LAG) traffic. The computer-useable storage medium has a computer-readable program. The program upon being processed on a computer causes the computer to implement: processing a packet received by a first module, wherein processing comprises synchronizing a group membership; transmitting the synchronized group membership to a second module; creating link aggregation group (LAG) entries for a primary switch and a secondary switch based on the synchronized group membership; transmitting one or more join requests to a router from the second module for adding a first interface link and a second interface link to the router; and placing the second interface link in a pruned state based on a protocol independent multicast (PIM) assert message received from the second module by the primary switch and the secondary switch, and forwarding traffic via the secondary link in the pruned state to an access switch upon the primary link failing.

One embodiment comprises a method that includes processing a packet received by a first module, the processing comprising synchronizing a group membership. The synchronized group membership is transmitted to a second module. Link aggregation group (LAG) entries are created for a primary switch and a secondary switch based on the synchronized group membership. One or more join requests are transmitted to a router from the second module for adding a first interface link and a second interface link to the router. The second interface link is placed in a pruned state based on a protocol independent multicast (PIM) assert message. The secondary interface link is used for forwarding network traffic to an access switch in the pruned state upon the primary interface link failing.

Other aspects and embodiments of the present invention will become apparent from the following detailed description, which, when taken in conjunction with the drawings, illustrate by way of example the principles of the invention.

DETAILED DESCRIPTION

Figure 1:
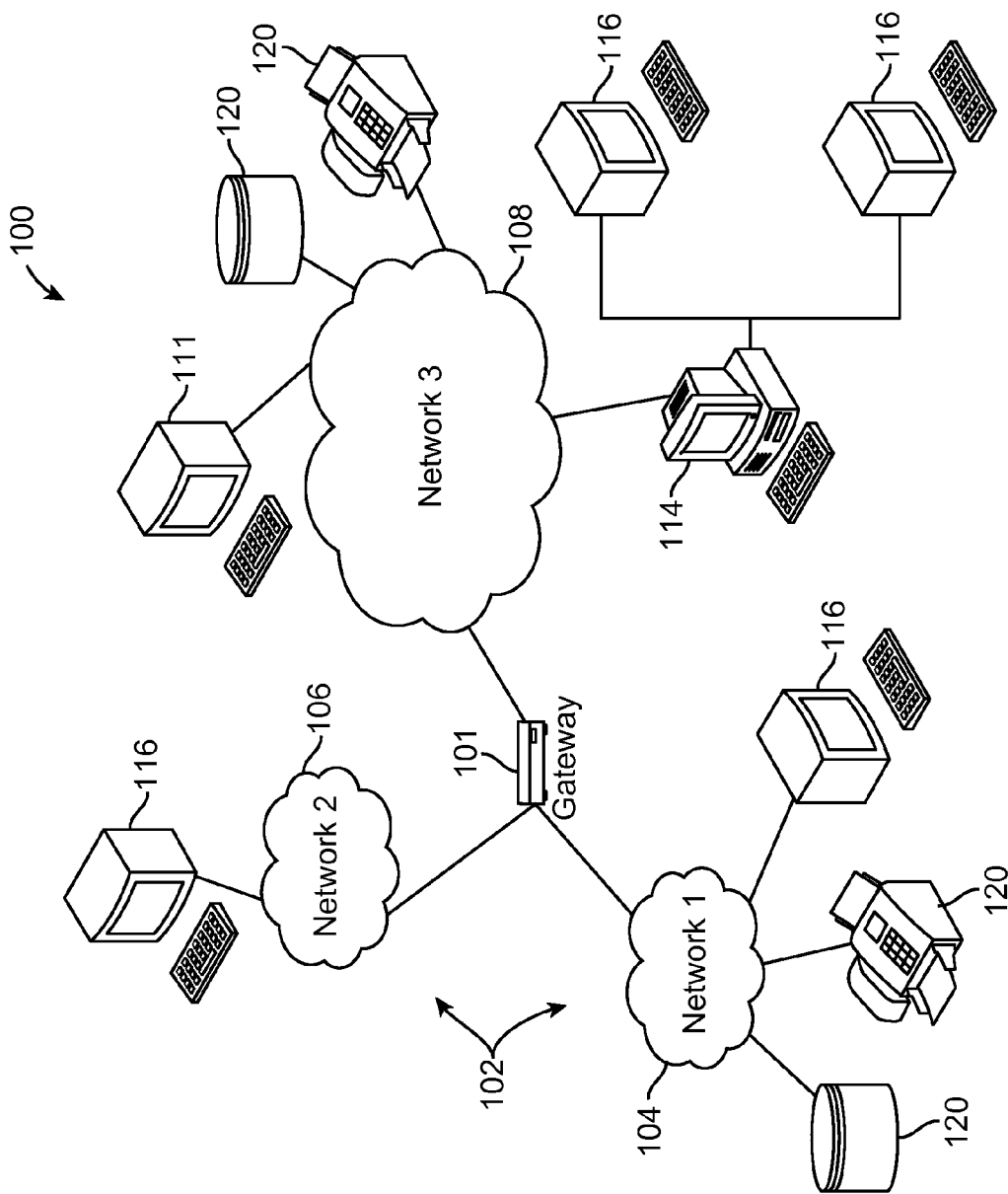
FIG. 1 is a network architecture, in accordance with one embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings, FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods, and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

Figure 2:
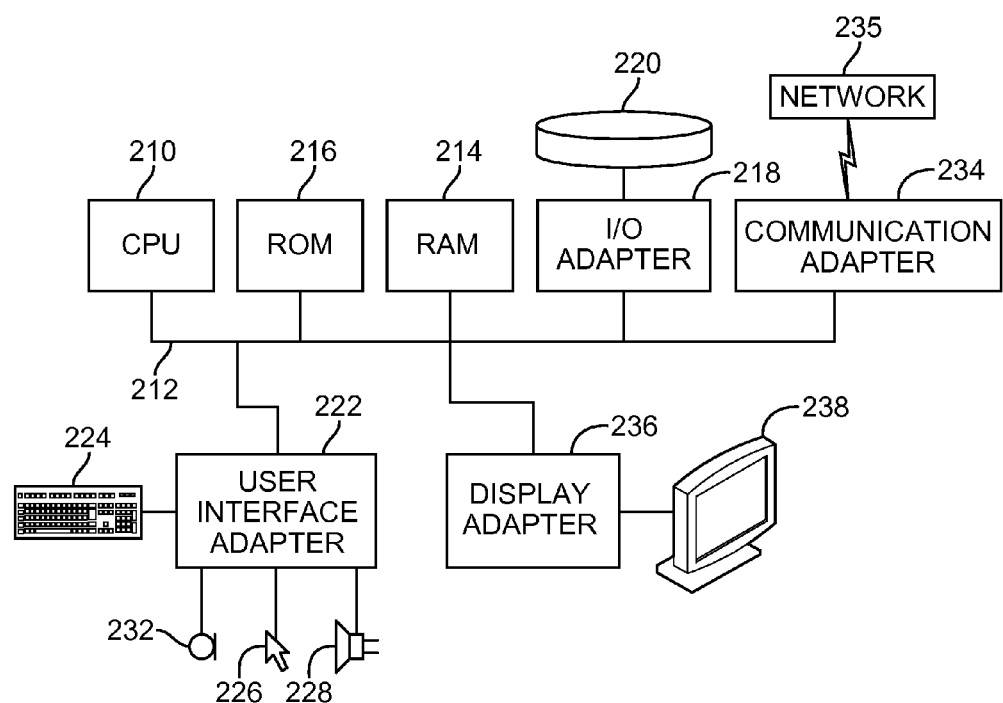
FIG. 2 shows a representative hardware environment that may be associated with the servers and/or clients of FIG. 1, in accordance with one embodiment of the invention.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

According to an embodiment of the invention, a system includes a first module that synchronizes a group membership and sets a router processing flag based on a received packet. A second module receives the router processing flag and information based on the synchronized group membership from the first module, creates LAG entries based on processing the information independent of the router processing flag, and transmits an interface list including the LAG entries to a primary switch and a secondary switch. In this embodiment, the multicast LAG entries are created with the same outgoing interface list for both the primary switch and the secondary switch, which synchronizes the primary and secondary switches.

Figure 3:
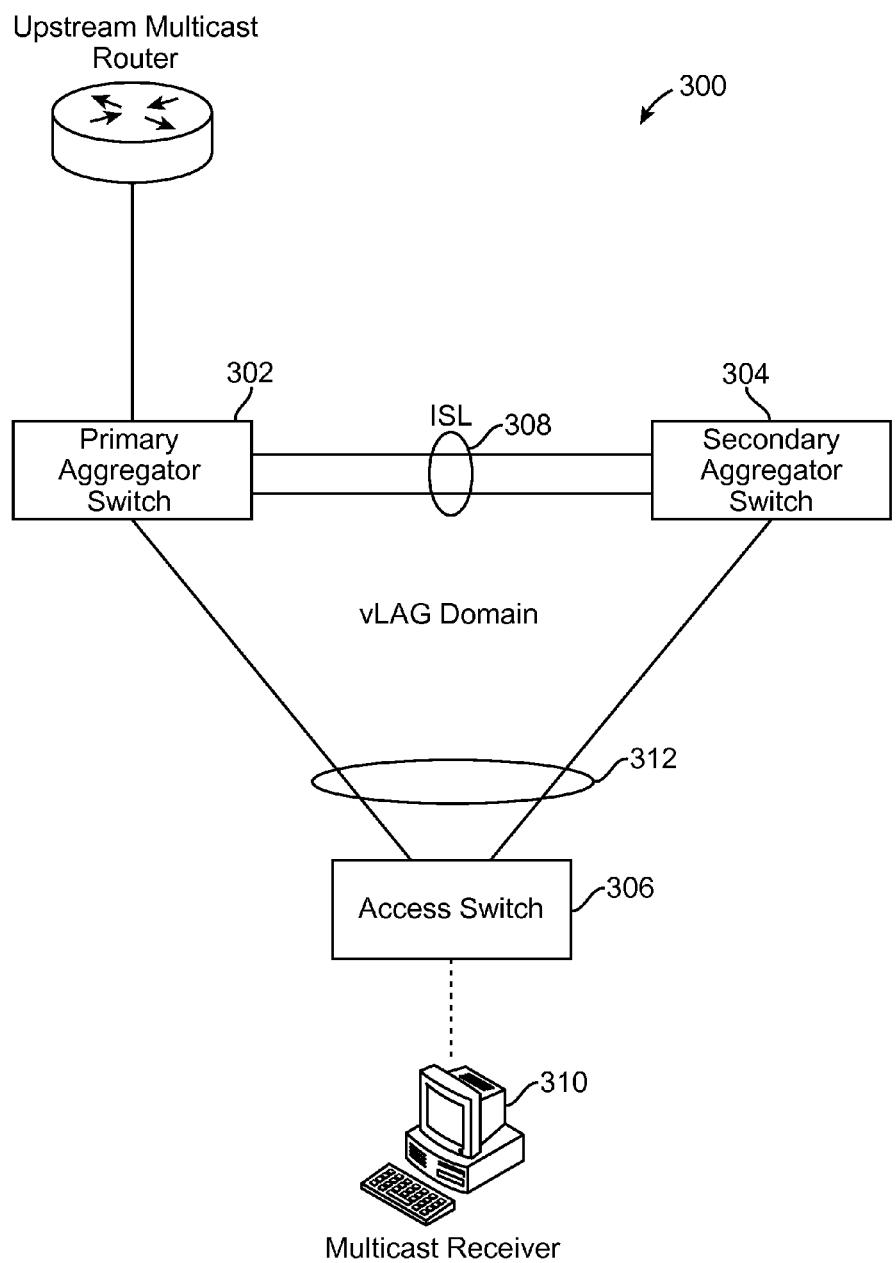
FIG. 3 is a diagram of an example data center system.

In a data center, an example of which is shown in FIG. 3, each access switch 306 is typically connected to two aggregation switches for redundancy, for example, primary switch 302 and secondary switch 304. VLAG is a feature that uses all available bandwidth without sacrificing redundancy and connectivity. Link aggregation is extended by vLAG across the switch boundary at the aggregation layer. Therefore, an access switch 306 has all uplinks in a LAG 312, while the aggregation switches 302, 304 cooperate with each other to maintain this vLAG.

Since vLAG is an extension to standard link aggregation, layer 2 and layer 3 features may be supported on top of vLAG. In the system 300 shown in FIG. 3, both primary aggregator switch 302 and secondary aggregator switch 304 have Internet Group Management Protocol (IGMP) snooping enabled. When the Internet Protocol (IP) multicast receiver 310 connected to the access switch 306 sends an IGMP report in a packet, the packet is forwarded to only one of the aggregator switches (either primary 302 or secondary 304) and an IP multicast group entry will be created in the switch in which the packet is sent.

In conventional methods, synchronization of these multicast group entries are achieved via special synchronization packets sent between the peer devices (primary switch 302 and secondary switch 304) using an inter-switch link (ISL) 308, which adds a latency to the traffic flow through the system 300.

When the primary switch 302 and the secondary switch 304 are set to have PIM enabled, a PIM Assert mechanism will occur in order to select an interface for traffic forwarding in order to prevent redundant traffic and the cost of bandwidth and processing power. The PIM assert results with the interface to the secondary switch 304 being pruned in favor of the interface to the primary switch 302. Hence, traffic communication will only occur over the primary switch 302. If the primary link to the primary switch 302 goes down, any downstream receiver will be prevented from receiving any traffic.

Figure 4:
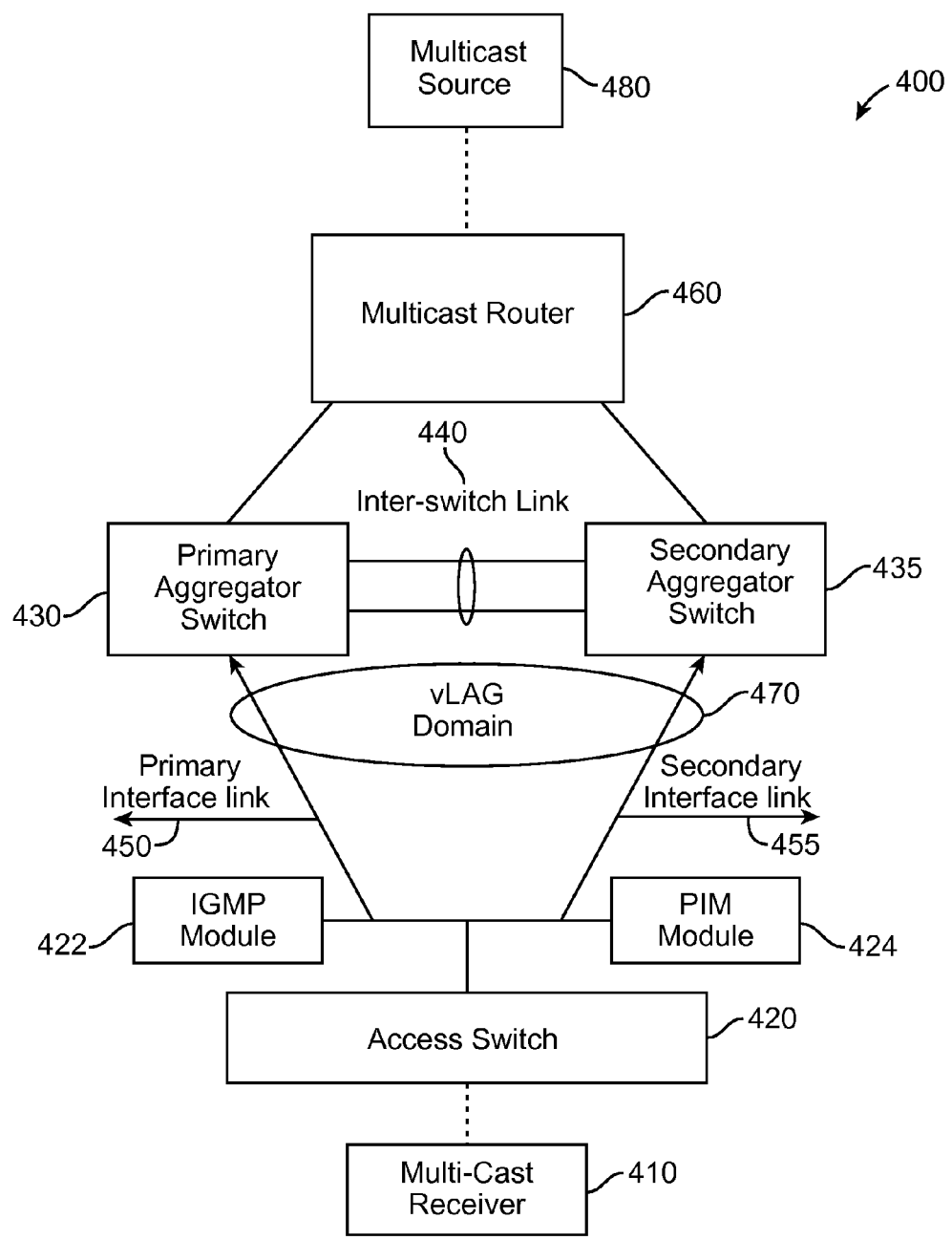
FIG. 4 is a block diagram of a system, according to one embodiment of the invention.

FIG. 4 shows a system 400 according to one embodiment. In system 400, all internet group management protocol (IGMP) packets are received by access switch or device 420 from a multicast receiver 410. In one embodiment, the access switch transmits an IGMP report packet toward the primary aggregator switch 430 and/or the secondary aggregator switch 435, where the IGMP report packet is processed by an IGMP module 422 and a protocol independent multicast (PIM) module 424. In one example, the IGMP module and the PIM module may be disposed: within the access switch 420, external to and coupled with the access switch 420, within the primary aggregator switch 430 and the secondary aggregator switch 435, etc.

In one embodiment, the IGMP module 422 processes the IGMP report packet by synchronizing a vLAG group membership between the primary aggregator switch 430 and the secondary aggregator switch 435. In one embodiment, an indication/information regarding the synchronized vLAG group membership is transmitted to the PIM module 424 from the IGMP module 422.

In one embodiment, the PIM module 424 creates LAG/vLAG entries by processing the LAG membership indication and transmits an interface list including the LAG/vLAG entries to the primary aggregator switch 430 and the secondary aggregator switch 435. In one example, the access switch 420 using the IGMP module 422 and the PIM module 424 sends packets out on a first virtual LAG (vLAG) in the vLAG domain 470, which corresponds to a first vLAG port or to a second vLAG in the vLAG domain 470 that corresponds to a second vLAG port.

In one embodiment, the primary aggregator switch 430 and the secondary aggregator switch 435 provide redundant connections between the multicast receiver 410 and the upstream multicast router 460. The primary aggregator switch 430 and the secondary aggregator switch 435 may allow multiple Ethernet links to be split across multiple switches, preventing any single point of failure and additionally allowing all switches to be load balanced across the primary aggregation switch 430 and the secondary aggregator switch 435 from the access switch 420.

In one embodiment, when the primary aggregator switch 430 and/or the secondary aggregator switch 435 receive an IGMP packet from one or more virtual link aggregation group (vLAG) ports (such as a vLAG port of the primary aggregator switch 430 or a vLAG port of the secondary aggregator switch 435), a source media access control (MAC) address of the received IGMP packet may be modified to be a switch MAC address of the aggregator switch associated with the vLAG port on which the IGMP packet was received and the IGMP packet is forwarded to a port of the ISL 440.

The last byte (LSB) of the source MAC address includes a trunk identifier (for the vLAG port) and/or trunk ID information for the vLAG port on which the IGMP packet was received. In one example, this trunk identifier may be used to program the receiver vLAG trunk identifier on the peer switch for data forwarding. In another example, IGMP reports received on non-vLAG ports are not modified.

In one example, since the PIM module 424 transmits an interface list including the LAG/vLAG entries to the primary aggregator switch 430 and the secondary aggregator switch 435, and the first aggregator switch 430 and the secondary aggregator switch 435 learns the interface entries on vLAG ports 431 and 436, respectively. Therefore, in one embodiment, no ISL 408 communication is required in order to synchronize the entries associated with the IGMP report, and an IP multicast group entry no longer needs to be explicitly synchronized by separate switch processing between the primary switch 430 and the secondary switch 435.

In one embodiment, the multicast router 460 receives one or more join requests transmitted towards a rendezvous point (RP) of the multicast router 460 from the PIM module 424 for adding a primary or forwarding interface link 450 and a secondary interface link 455 for communication with the multicast router 460. In one example, a multicast source 480 connected to the multicast router 460 transmits traffic for the LAG/vLAG, and the primary aggregator switch 430 and the secondary aggregator switch 435 receive traffic from each other over the ISL 440. In one embodiment, a PIM Assert message is issued by the PIM module 424 for selection of the primary aggregator switch 430 or the secondary aggregator switch 435. In one example, the primary aggregator switch 430 is selected as the assert winner, and the secondary interface link 455 becomes a pruned interface link based on the assert mechanism.

In one embodiment, upon the primary vLAG interface link 450 failing (i.e., the link is down due to failure, swap out, etc.), the secondary interface link 455 is enabled to forward traffic to the access switch 420 even though it was placed in a pruned state by the assert mechanism. The forwarding of traffic in the pruned state by the secondary interface link 455 ensures that traffic communication continues even when the primary interface link 450 has gone down.

Figure 5:
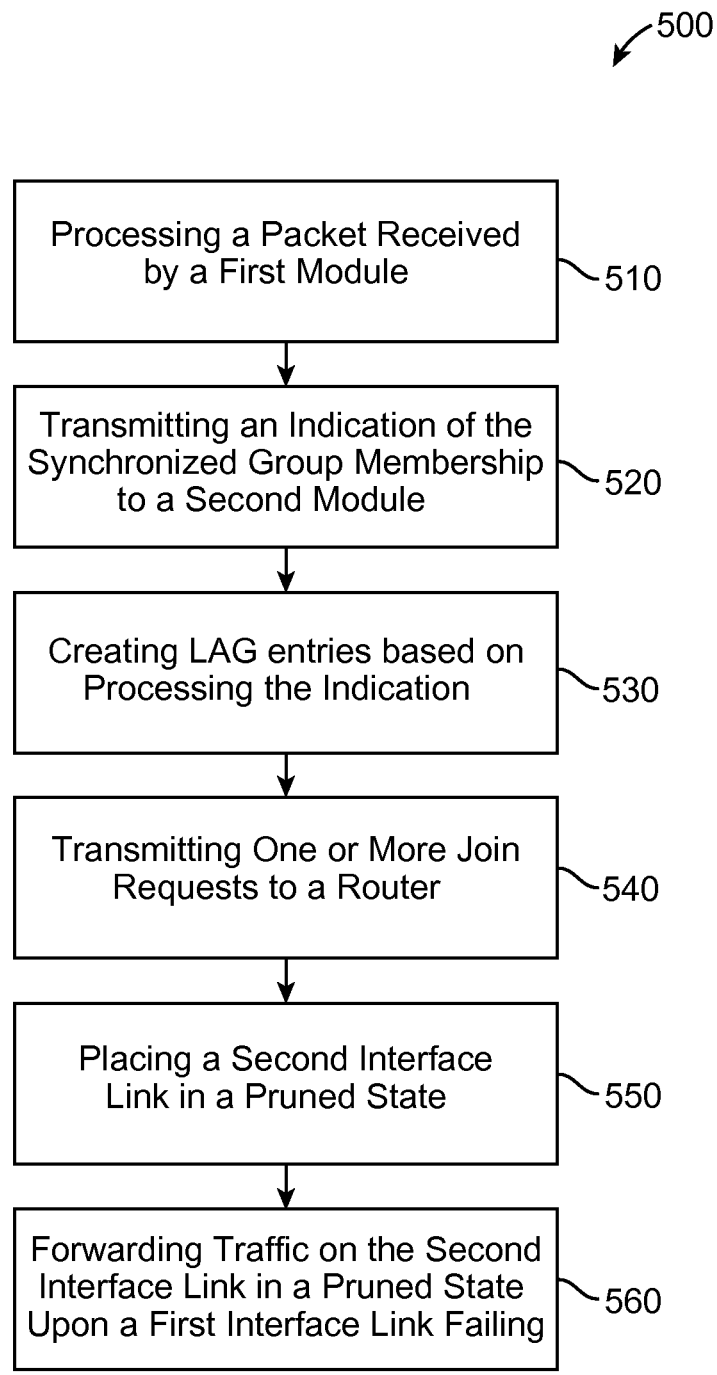
FIG. 5 is a block diagram showing a process for forwarding vLAG traffic, in accordance with an embodiment of the invention.

FIG. 5 shows a block diagram of a process 500 for vLAG entry synchronization, according to one embodiment. Process 500 may be performed in accordance with any of the environments depicted in FIGS. 1-4 among others, in various embodiments. Each of the blocks 510-550 of process 500 may be performed by any suitable component of the operating environment. In one example, process 500 may be partially or entirely performed by an aggregator switch, an IGMP module, a PIM module, etc.

As shown in FIG. 5, in process block 510, a packet received by a first module, for example, from an access switch (e.g., access switch 420), or a multicast receiver, such as multicast receiver 410, and processed by synchronizing a group membership (e.g., LAG/vLAG). In one embodiment, the packet includes an IGMP report and the first module may be an IGMP module, such as IGMP module 422. In one embodiment, in processing block 520, information based on the synchronized group membership is transmitted to a second module, such as PIM module 424.

In process block 530, the second module creates LAG/vLAG entries based on processing the information transmitted in block 520. In process block 540, one or more join requests are transmitted toward an RP of a multicast router, such as multicast router 460, from the second module. In process block 550, a second interface link, such as secondary interface link 455, is placed in a pruned state based on an assert mechanism selecting a first interface link, such as primary interface link 450, as the forwarding interface link. In process block 560, upon the first interface link failing, traffic is forwarded on the second interface link that is in the pruned state.

In one embodiment, if the incoming multicast network traffic arrives on the secondary aggregator switch and the primary forwarding interface link is down, the multicast traffic is forwarded using the pruned interface link.

According to various embodiments, the process 500 may be performed by a system, computer, or some other device capable of executing commands, logic, etc., as would be understood by one of skill in the art upon reading the present descriptions.

In the above described embodiments, there is no special processing required for these packets at the peer node or switch other than recognizing that the packet is received on the interface connected to the multicast router, where one of the interface links is pruned and the assert winner forwarding interface link is down.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system, comprising:
    a first module that receives a packet, and synchronizes a group membership based on the packet;
    a second module that receives the synchronized group membership from the first module, and creates link aggregation group (LAG) entries for a primary switch and a secondary switch based on the synchronized group membership;
    a router that receives one or more join requests from the second module for adding a first interface link and a second interface link to the router; and
    a source coupled to the router that transmits traffic for the LAG, wherein the primary switch and the secondary switch receive traffic over an inter-switch link (ISL) port;
    wherein the second interface link is placed in a protocol independent multicast (PIM) pruned state based on a PIM assert message received from the second module by the primary switch and the secondary switch, and the second interface link is enabled upon the first interface link failing, wherein the second interface link forwards traffic and continues to forward traffic to an access switch even while remaining placed in the PIM pruned state.

2. The system of claim 1, wherein the LAG entries include virtual LAG (vLAG) entries.

3. The system of claim 2, wherein the packet comprises an Internet group management protocol (IGMP) update report.

4. The system of claim 3, wherein the first module comprises an IGMP module, and the second module comprises a protocol independent multicast (PIM) module.

5. The system of claim 4, wherein the first interface link and the second interface link are both vLAG interface links.

6. The system of claim 4, wherein the router comprises a multicast router, and the second module transmits the join requests towards a rendezvous point of the multicast router.

7. The system of claim 6, wherein the PIM module transmits the traffic to the second interface when the first interface link has failed.

8. A non-transitory computer-useable storage medium for forwarding link aggregation group (LAG) traffic, the computer-useable storage medium having a computer-readable program, wherein the program upon being processed on a computer causes the computer to implement:
   processing a packet received by a first module, wherein processing comprises synchronizing a group membership;
   transmitting the synchronized group membership to a second module;
   creating link aggregation group (LAG) entries for a primary switch and a secondary switch based on the synchronized group membership;
   transmitting one or more join requests to a router from the second module for adding a first interface link and a second interface link to the router; and
   placing the second interface link in a protocol independent multicast (PIM) pruned state based on a PIM assert message received from the second module by the primary switch and the secondary switch, and enabling the second interface link upon the first interface link connected to the access switch failing, wherein the second interface link forwards traffic and continues to forward traffic to the access switch even while remaining in the PIM pruned state.

9. The program of claim 8, wherein the LAG entries include virtual LAG (vLAG) entries.

10. The program of claim 9, wherein the packet comprises an Internet group management protocol (IGMP) update report, the first module comprises an IGMP module, and the second module comprises a protocol independent multicast (PIM) module.

11. The program of claim 10, wherein the first interface link and the second interface link are both vLAG interface links.

12. The program of claim 11, wherein the router comprises a multicast router, and the second module transmits the join requests towards a rendezvous point of the multicast router.

13. The program of claim 12, wherein the PIM module transmits the traffic to the second interface link when the first interface link has failed.

14. A method, comprising:
   processing a packet received by a first module, the processing comprising synchronizing a group membership;
   transmitting the synchronized group membership to a second module;
   creating link aggregation group (LAG) entries for a primary switch and a secondary switch based on the synchronized group membership;
   transmitting one or more join requests to a router from the second module for adding a first interface link and a second interface link to the router;
   placing the second interface link in a protocol independent multicast (PIM) pruned state based on a PIM assert message; and
   enabling the second interface link upon the first interface link failing, wherein the second interface link forwards network traffic and continues to forward network traffic to an access switch even while remaining in the PIM pruned state.

15. The method of claim 14, wherein the LAG entries include virtual LAG (vLAG) entries.

16. The method of claim 15, wherein the packet comprises an Internet group management protocol (IGMP) update report.

17. The method of claim 16, wherein the first module comprises an IGMP module, and the second module comprises a protocol independent multicast (PIM) module.

18. The method of claim 17, wherein the first interface link and the second interface link are both vLAG interface links.

19. The method of claim 18, wherein the router comprises a multicast router, and the second module transmits the join requests towards a rendezvous point of the multicast router.

20. The method of claim 19, wherein the PIM module transmits the traffic to the second interface link when the first interface link has failed first based on ignoring PIM pruned interface rules.

* * * * *